United States Patent
Sasaki et al.

(10) Patent No.: US 6,997,812 B2
(45) Date of Patent: Feb. 14, 2006

(54) DRIVE SHAFT FOR USE IN PORTABLE WORKING MACHINE

(75) Inventors: Hideshi Sasaki, Wako (JP); Makoto Warashina, Wako (JP); Hiroaki Uchitani, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 148 days.

(21) Appl. No.: 10/412,472

(22) Filed: Apr. 11, 2003

(65) Prior Publication Data

US 2003/0199327 A1 Oct. 23, 2003

(30) Foreign Application Priority Data

Apr. 19, 2002 (JP) ............................ 2002-117507

(51) Int. Cl.
 *F16C 3/035* (2006.01)

(52) U.S. Cl. ...................................... 464/162; 464/180

(58) Field of Classification Search .................... 464/1, 464/52, 162, 180; 384/29, 32, 42, 283, 290, 384/13, 280, 286
 See application file for complete search history.

(56) References Cited

U.S. PATENT DOCUMENTS

| 2,388,241 | A | * | 11/1945 | Arens ........................ 384/29 X |
| 2,889,695 | A | * | 6/1959 | Moeller ...................... 464/180 |
| 3,070,408 | A | * | 12/1962 | Reuter |
| 3,367,141 | A | * | 2/1968 | Baughman et al. ..... 464/162 X |
| RE28,868 | E | * | 6/1976 | Spaeder, Jr. |
| 4,020,651 | A | * | 5/1977 | Callies .................... 464/162 X |
| 4,747,799 | A | * | 5/1988 | Kato ........................... 464/52 |
| 5,558,578 | A | * | 9/1996 | Uryu et al. ................... 464/52 |
| 6,710,516 | B1 | * | 3/2004 | Tamai |
| 6,739,058 | B2 | * | 5/2004 | Warashina et al. ...... 464/180 X |

FOREIGN PATENT DOCUMENTS

| FR | 2 637 334 | * | 4/1990 | .................. 464/180 |
| JP | 1071238 | | 5/1989 | |

\* cited by examiner

*Primary Examiner*—Greg Binda
(74) *Attorney, Agent, or Firm*—Adams & Wilks

(57) ABSTRACT

A drive shaft extends into a tubular member for use in a portable working machine. The drive shaft is mounted relative to the tubular member so as to undergo rotation relative to the tubular member. The drive shaft has a longitudinal axis and resin bushes integrally mounted on the drive shaft for rotation therewith at positions along the longitudinal axis corresponding to vibration nodes of the drive shaft. Each of the resin bushes has an outer peripheral surface disposed in slidable contact with an inner peripheral surface of the tubular member.

5 Claims, 12 Drawing Sheets

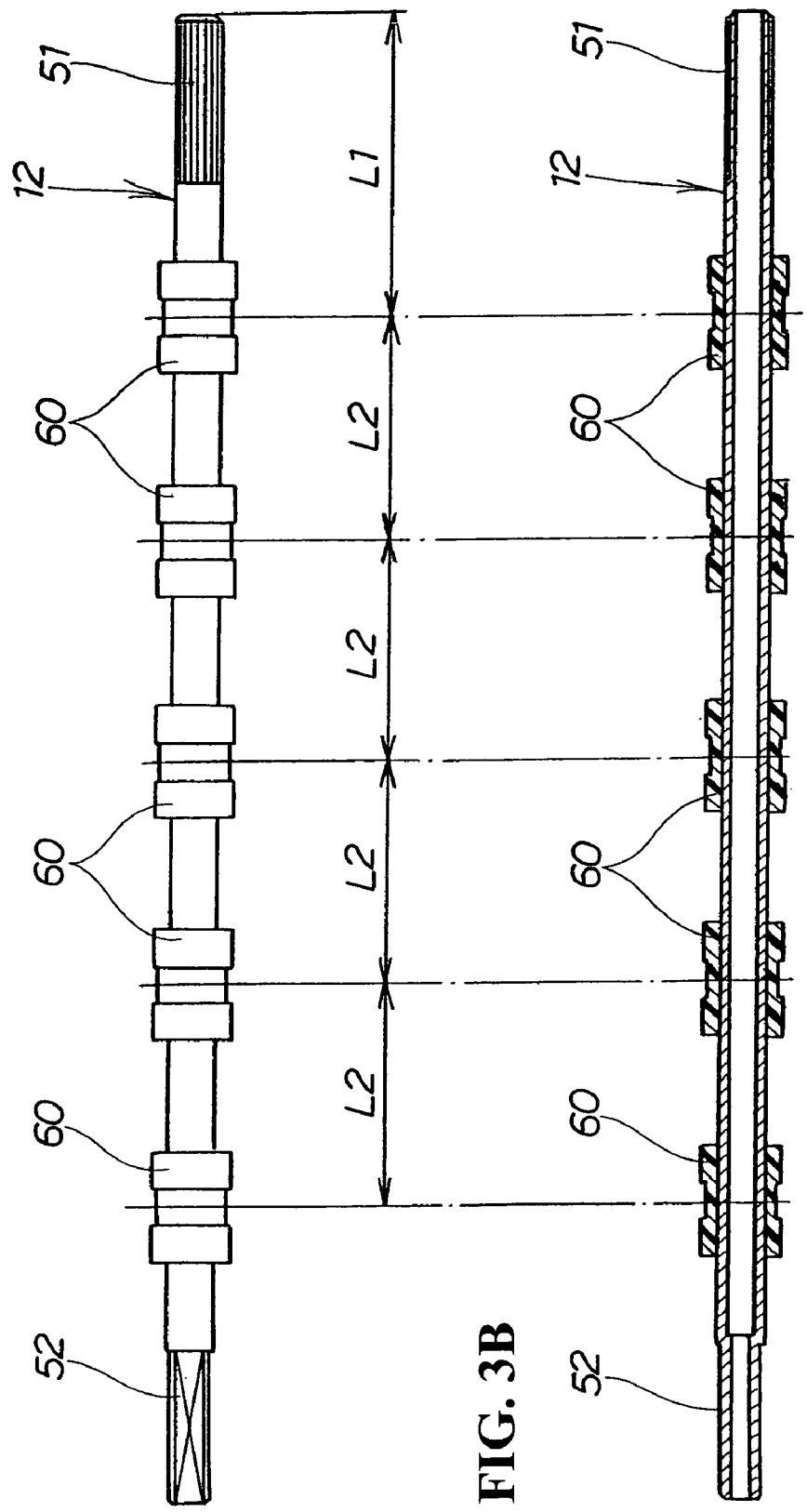

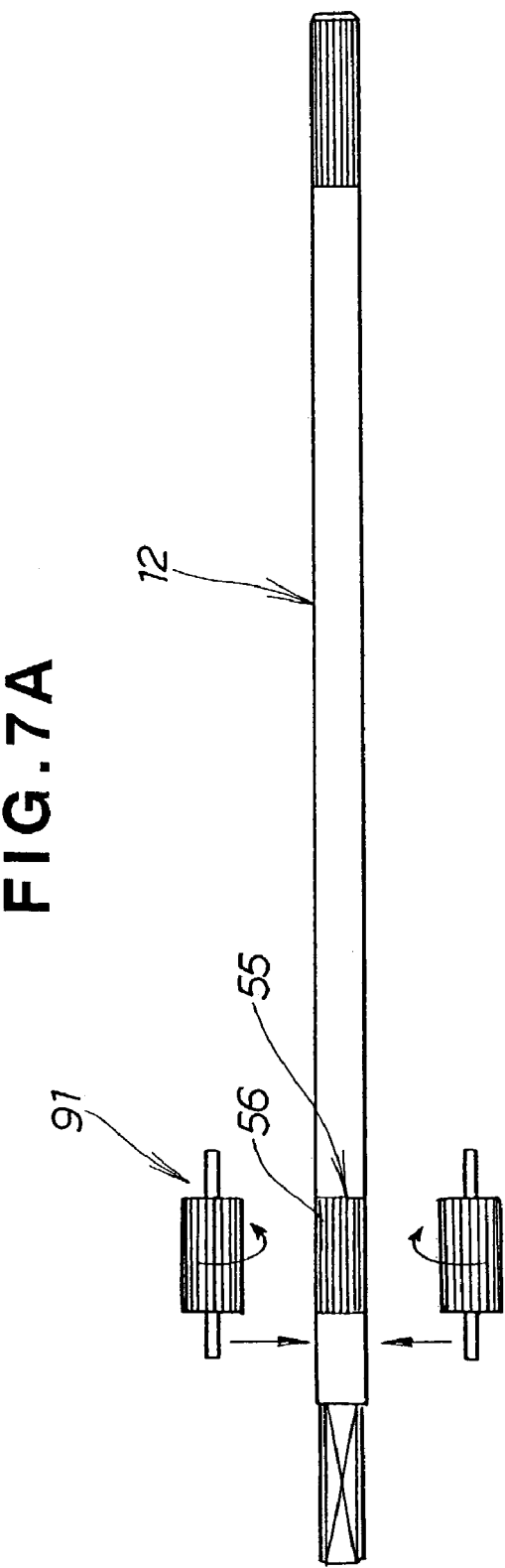
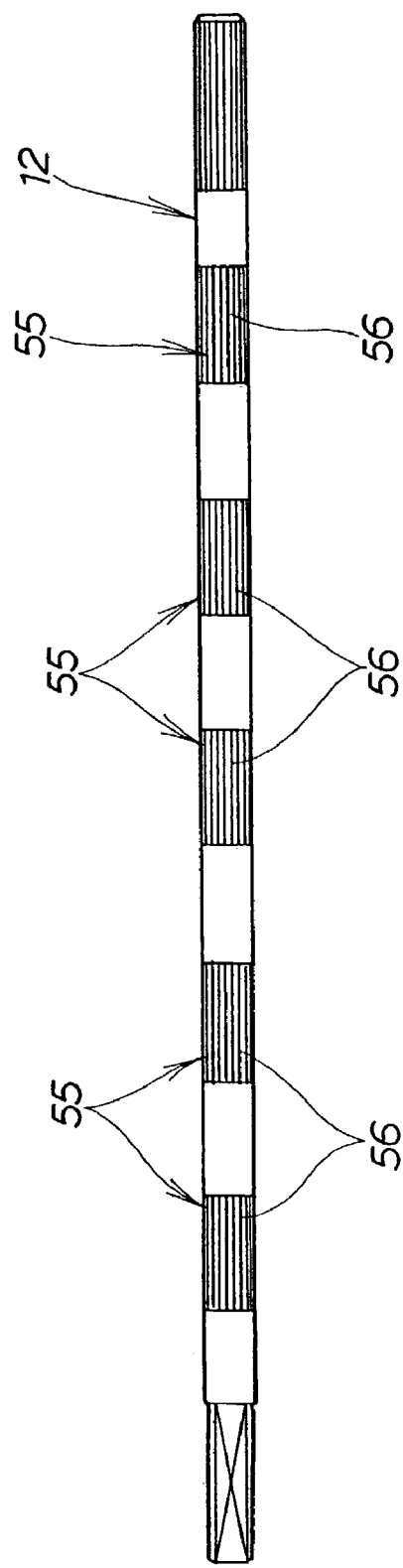

DRIVE SHAFT FOR USE IN PORTABLE WORKING MACHINE

FIELD OF THE INVENTION

1. Background of the Invention

The present invention relates to an improvement in drive shafts for use in portable working machines such as grass cutters, and a method for forming bushes on the drive shafts.

2. Background Information

In some conventional work machines, drive shafts are inserted into tubular operating poles and rotated by motors provided at one ends of the operating poles to rotate working portions provided at the other ends of the operating poles. These conventional working machines include grass cutters, for example.

In the conventional grass cutters, the motors are driven to rotate the drive shafts, rotating cutting blades provided at the other ends of the operating poles. Operators hang the grass cutters on them with belts and hold bar-shaped handles provided at midway points of the operating poles to move the operating poles back and forth and left and right, thereby cutting grass with the cutting blades.

In recent years, it has been required to further improve the agricultural work environment. In order to reduce the labor of the operators of the grass cutters, it is preferable to further reduce vibration transmitted from the drive shafts via the operating poles to the bar-shaped handles.

The drive shafts inserted through the operating poles are long, having large deflections under their own weights. The rotation of the motors thus causes flexural oscillations in the drive shafts due to their own weights. A general method of reducing flexural oscillations is to support the drive shafts with a plurality of bearings provided longitudinally along the shafts.

This kind of portable working machine is disclosed, for example, in Japanese Utility Model Laid-Open Publication No. HEI-1-71238 entitled "Bearing Bush for working Machines." The structure of this bearing bush is shown in FIGS. 12A, 12B and 12C.

A grass cutter 100 shown in FIG. 12A has a transmission shaft 102 inserted through a main pipe 101 (corresponding to an operating pole) and a bearing 103 interposed between the main pipe 101 and the transmission shaft 102, so as to reduce the deflection of the transmission shaft 102. The transmission shaft 102 is rotated by an engine 104 provided at one end of the main pipe 101 to rotate a working blade 105 provided at the other end of the main pipe 101.

As shown in FIG. 12B, a rubber bearing bush 106 is mounted on the outer periphery of the bearing 103. The rubber bearing bush 106 serves as a mount rubber for mounting the bearing 103 inside the main pipe 101.

FIG. 12C illustrates a detailed cross section of portion c in FIG. 12A. The rubber bearing bush 106 is press-fitted into the main pipe 101 to mount the bearing 103 in a predetermined position within the main pipe 101. The press-fitting of the bush 106 causes the bearing 103 to be fastened with the bush 106, immovably fixed to the bush 106. In short, the bearing 103 is non-rotatably mounted inside the main pipe 101 via the bush 106. The transmission shaft 102 is inserted through the bearing 103 to insert the transmission shaft 102 through the main pipe 101. The transmission shaft 102 is rotatably supported on the bearing 103 mounted within the main pipe 101.

The conventional bearing 103 is mounted inside the main pipe 101 via the rubber bearing bush 106. The rubber bearing bush 106 can resiliently deform when being press-fitted into the main pipe 101. Thus required is care to avoid the misalignment of the center of the bearing 103.

The fact that the rubber bearing bush 106 is only press-fitted into the main pipe 101 further requires care to precisely place the bearing 103 in a predetermined longitudinal position of the main pipe 101. Also required is care to avoid the change of position of the bearing shaft 103 during use.

The deviation of the center and mounting pitch of the bearing 103 with respect to the main pipe 101 can cause vibration in the transmission shaft 102. Thus required is a simple structure and method for further reducing the vibration of the transmission shaft 102.

SUMMARY OF THE INVENTION

According to an aspect of the present invention, there is provided a drive shaft being able to be inserted into a pipe-shaped operating pole for use in portable working machines, which drive shaft comprises: one or more resin bushes integrally mounted on the periphery of the drive shaft to be slidable on the operating pole.

Since the resin bushes are thus integrally mounted on the drive shaft, the axis center of the resin bushes can precisely agree with the axis center of the drive shaft. Further, the resin bushes can be precisely positioned in the longitudinal direction of the drive shaft, prevented from displacement with respect to the drive shaft.

When the drive shaft provided with the resin bushes is inserted into the operating pole with the resin bushes slid on the operating pole, the axis center of the resin buses and the axis center of the drive shaft can precisely agree with the axis center of the operating pole. Further, the drive shaft can be securely supported at predetermined positions on the operating pole. The simple structure can thus further reduce vibration caused in the drive shaft. In addition, since the resin bushes are integrally mounted on the drive shaft, the positions of the resin bushes are prevented from change during use.

Preferably, the resin bush has a peripheral groove for storing a lubricant in the middle of the outer peripheral surface thereof. To mount the resin bushes on the drive shaft by integral molding, a gate through which molten resin is injected into a molding cavity of a molding die is placed at the position of the peripheral groove. With this placement, if the removal of resin within the gate after molding lefts a fin, the fin is left only at the peripheral groove. The fin has no influence on the slide of the resin bush on the operating pole. Further, the peripheral grooves can store the lubricant such as grease and oil, increasing lubricity during the slide of the resin bushes on the operating pole, and reducing friction resistance and wear.

In a preferred form, the resin bushes are arranged at vibration nodes of the drive shaft. The vibration nodes of the drive shaft, that is, several points at which amplitude is zero are supported on the operating pole via the resin bushes. Vibration transmitted from the motor via the drive shaft and the resin bushes to the operating pole is thus further reduced.

According to another aspect of the present invention, there is provided a method of integrally forming a plurality of bushes on the outer peripheral surface of a drive shaft to be able to be inserted into a pipe-shaped operating pole for use in portable working machines, which method comprises the steps of: placing one of a plurality of predetermined portions of the drive shaft in a molding die for clamping; injecting molten resin into a molding cavity of the molding die for forming the bush; opening the molding die after the bush is cooled; and moving the drive shaft to place a next one of the predetermined portions of the drive shaft in the molding die.

In the inventive method, the resin bushes can be successively integrally molded on the drive shaft. Thus by the simple method, the resin bushes can be easily integrally formed on the outer peripheral surface of the drive shaft to be inserted through the pipe-shaped operating pole.

Further, the integral molding of the bushes on the drive shaft allows precise agreement of the axis center of the resin bushes with the axis center of the drive shaft. In addition, the resin bushes can be easily and precisely positioned in the longitudinal direction of the drive shaft.

Further, according to the method of this invention, when the drive shaft provided with the resin bushes is inserted into the operating pole with the resin bushes slid on the operating pole, the axis center of the resin buses and the axis center of the drive shaft can precisely agree with the axis center of the operating pole. Further, the drive shaft can be securely supported at predetermined positions on the operating pole. The simple structure and method can thus further reduce vibration caused in the drive shaft. In addition, since the resin bushes are integrally mounted on the drive shaft, the positions of the resin bushes are prevented from change during use.

BRIEF DESCRIPTION OF THE DRAWINGS

Certain preferred embodiments of the present invention will be described in detail below, by way of example only, with reference to the accompanying drawings, in which:

FIGS. 3(a) and 3(b) are a front view of a drive shaft shown in FIG. 2 and its cross-sectional view;

FIGS. 7A and 7B are diagrams of a first step of forming the bushes on the drive shaft, in which longitudinal teeth are formed on the outer peripheral surface of the drive shaft at predetermined bush-forming portions;

FIG. 8B is a cross-sectional view taken along line 8B—8B in FIG. 8A;

FIG. 9B is a cross-sectional view taken along line 9B—9B in FIG. 9A;

FIG. 10B is a cross-sectional view taken along line 10B—10B in FIG. 10A;

FIG. 11B is a cross-sectional view taken long line 11B—11B in FIG. 11A.

DETAILED DESCRIPTION OF THE PREFERRED EMBODIMENTS

Figure 1:
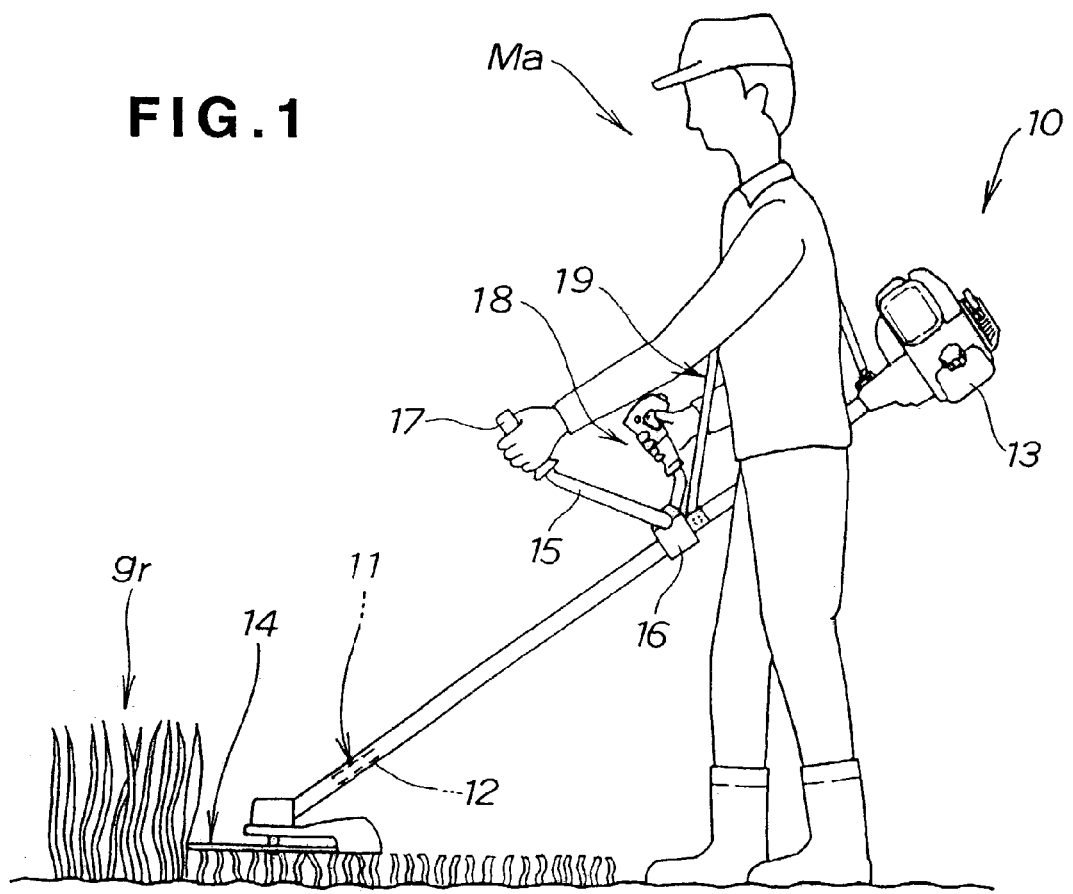
FIG. 1 is an explanatory view illustrating the use of a grass cutter according to the present invention.

Initial reference is made to FIG. 1 showing a grass cutter 10 as an example of a portable working machine. The grass cutter 10 includes a tubular member or pipe-shaped operating pole 11, a motor 13 provided at one end of the operating pole 11, a drive shaft 12 inserted into the operating pole 11 and driven by the driving of the motor 13, and a work implement such as a cutting blade 14 provided at the other end of the operating pole 11 and rotated by the rotation of the drive shaft 12. The grass cutter 10 has a handle holder 16 for fixing a handle 15 at a longitudinally midway point of the operating pole 11, forming a crisscross in a plan view. The motor 13 is an engine or an electric motor. The cutting blade 14 is a working portion.

The bar-shaped handle 15 has a substantially U shape in a front view and is made from a pipe material or a bar member, extending left and right with a central part mounted on the operating pole 11, and having a left grip 17 and a right grip 18 provided at its left and right distal ends. The right grip 18 is an operating portion provided with a throttle lever and a lock lever for controlling the motor 13.

An operator Ma can hang the grass cutter 10 on his shoulder with a shoulder suspender belt 19 provided at a longitudinally midway point of the operating pole 11. The operator Ma holds the left and right grips 17 and 18 to move the operating pole 11 back and forth and left and right, cutting grass gr with the cutting blade 14 rotated by the motor 13.

Figure 2:
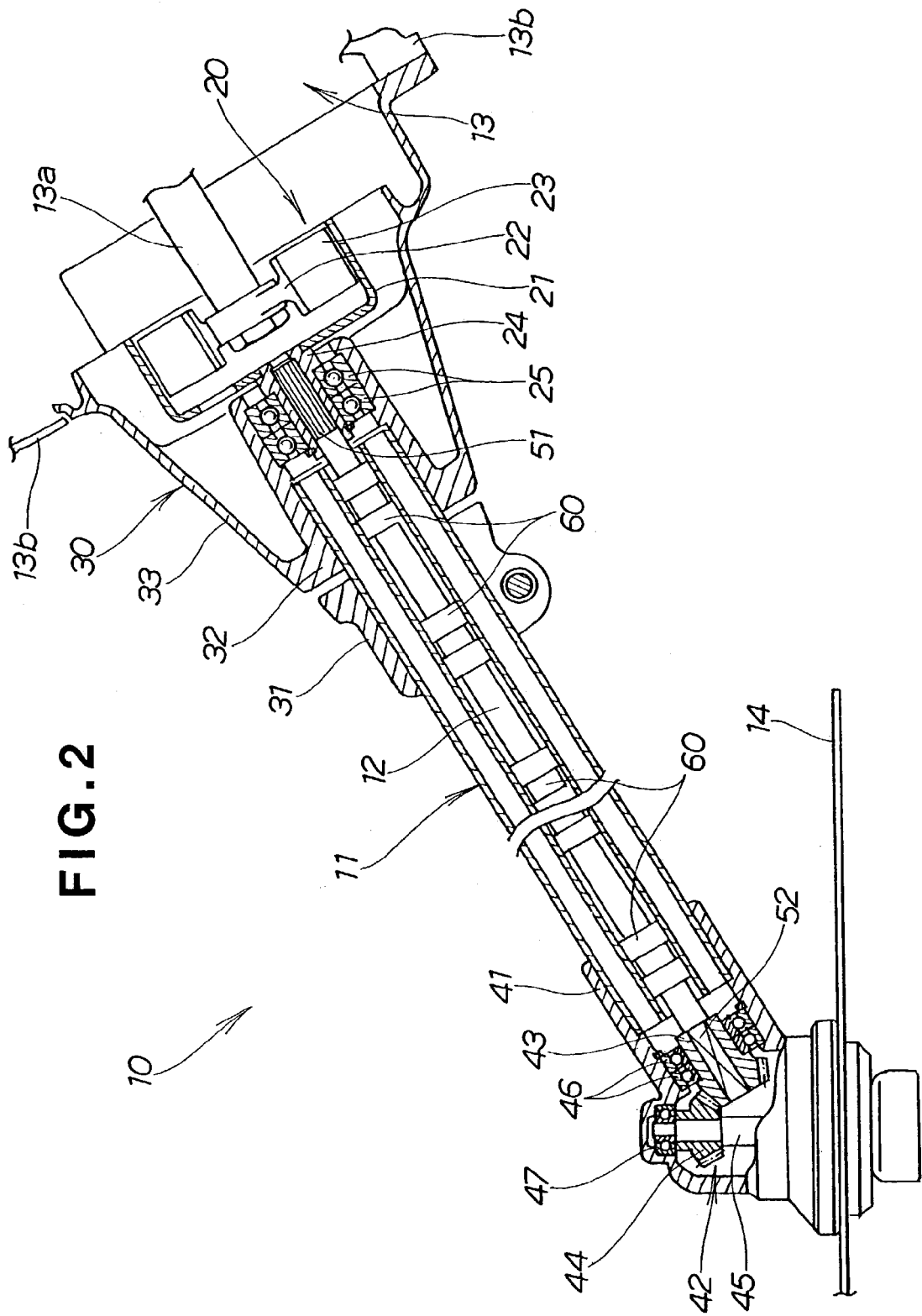
FIG. 2 is a cross-sectional view of an operating pole extending between a motor and a cutting blade of the grass cutter shown in FIG. 1.

As shown in FIG. 2, a clutch mechanism 20 is interposed between the drive shaft 12 and an output shaft 13a of the motor 13. The clutch mechanism 20 is housed in a clutch case 30. The motor 13 is mounted at one end of the operating pole 11 via the clutch case 30. The operating pole 11 and the drive shaft 12 are arranged concentrically with the output shaft 13a of the motor 13.

The clutch mechanism 20 is a centrifugal clutch including a clutch drum 21 spline-coupled to a motor-side shaft end 51 of the drive shaft 12, a rotating member 22 mounted on the output shaft 13a of the motor 13, and a clutch member 23 for connecting the rotating member 22 to the clutch drum 21 only when the rotating member 22 rotates at high speeds. The clutch drum 21 is a cup-shaped member surrounding the rotating member 22 and the clutch member 23.

The clutch case 30 is an integral resin mold including an operating pole mounting portion 31 for mounting the one end of the operating pole 11, a flexible connecting portion 32 having flexibility extending from the operating pole mounting portion 31 to the motor 13, and a motor mounting portion 33 mounted to the motor 13, extending from the flexible connecting portion 32 to the motor 13. The motor mounting portion 33 is bolted to a case 13b of the motor 13.

The cutting blade 14 is mounted to the other end of the operating pole 11 via a transmission mechanism case 41. A transmission mechanism 42 for transmitting the rotating power of the drive shaft 12 to the cutting blade 14 is interposed between the drive shaft 12 and the cutting blade 14. The transmission mechanism 42 is housed in the transmission mechanism case 41. The transmission mechanism 42 includes a drive bevel gear 43 connected to a cutting-blade-side shaft end 52 of the drive shaft 12, a driven bevel gear 44 engaging the drive bevel gear 43, and a driven shaft 45 provided between the driven bevel gear 44 and the cutting blade 14.

The drive shaft 12 is rotatably supported at several portions in the longitudinal direction. Specifically, the drive shaft 12 is supported at the following portions.

First, the motor-side shaft end 51 is spline-coupled to a boss 24 provided at the clutch drum 21. That is, the one end of the drive shaft 12 is rotatably supported at the motor mounting portion 33 of the clutch case 30 via the boss 24 and bearings 25, 25.

Second, the drive bevel gear 43 is connected to the cutting-blade-side shaft end 52. The drive bevel gear 43 is rotatably supported at the transmission mechanism case 41 via bearings 46, 46. That is, the other end of the drive shaft 12 is supported at the transmission mechanism case 41 via the drive bevel gear 43 and the bearings 46, 46.

Third, the portion of the drive shaft 12 between the motor-side shaft end 51 and the cutting-blade-side shaft end 52 is supported on the operating pole 11 via a plurality of bushes 60 longitudinally aligned at predetermined intervals. Reference numeral 47 denotes a driven shaft supporting bearing.

FIGS. 3(a) and 3(b) illustrate the drive shaft 12 according to the present invention. As shown in FIG. 3(a), the drive shaft 12 has at its one end the motor-side shaft end 51 and at its other end the cutting-blade-side shaft end 52. The drive shaft 12 is a pipe as shown in FIG. 3(b). The motor-side shaft end 51 has male splines. The cutting-blade-side shaft end 52 is a fitting protrusion formed in a substantially quadrangular cross section with its outer peripheral surface cut into four planes.

The present invention is characterized in that the bushes 60 is integrally mounted on the drive shaft 12. More specifically, one of the bushes 60 is mounted in a position at a predetermined distance L1 from the one end of the drive shaft 12, and from that position, the other bushes 60 are further mounted with predetermined pitches L2. In this manner, the bushes 60 is integrally mounted on the outer peripheral surface of the drive shaft 12.

Figure 4A:
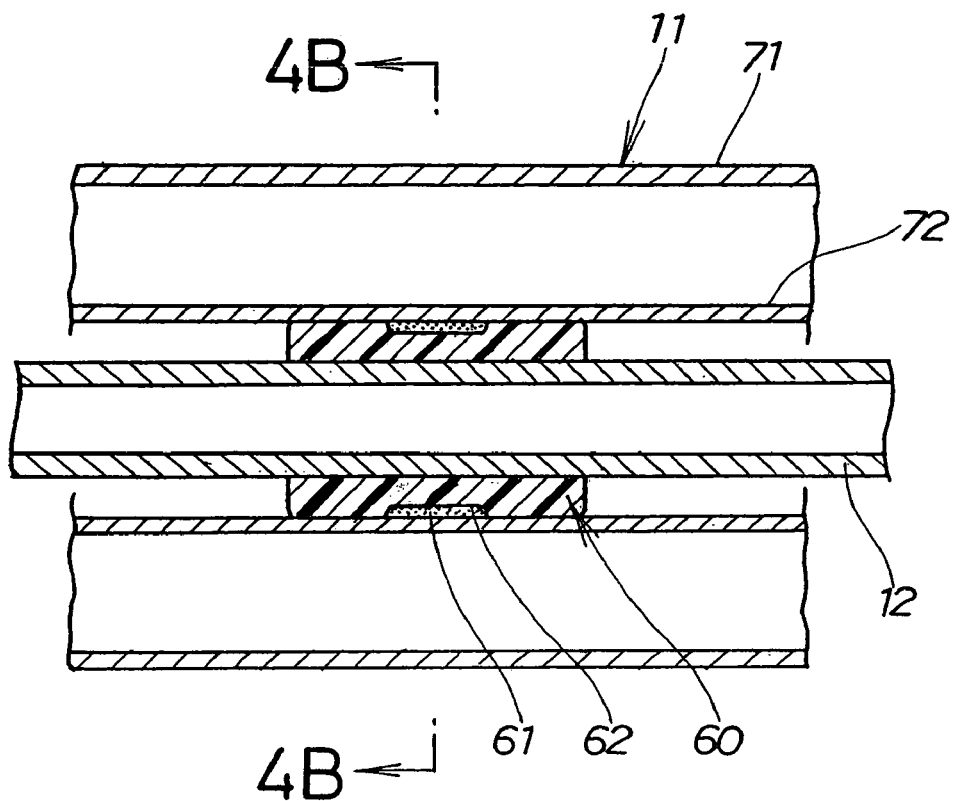
FIGS. 4A and 4B are enlarged cross-sectional views illustrating the relationships between the operating pole, the drive shaft and a bush shown in FIG. 2.
Figure 4B:
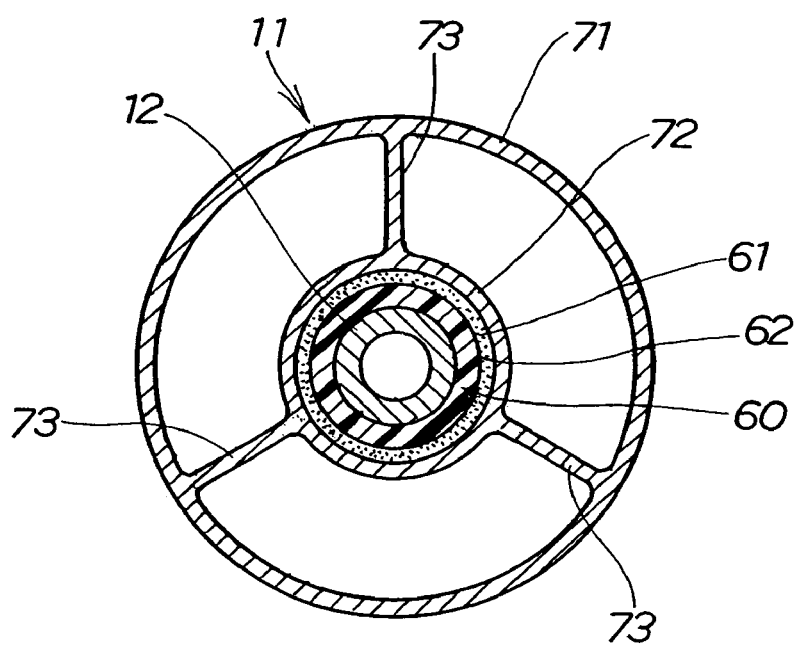

FIGS. 4A and 4B illustrate the cross sections of the operating pole 11, the drive shaft 12 and the bush 60 according to the present invention. FIG. 4A illustrates that the bush 60 is integrally mounted on the drive shaft 12 which is slidable at the bush 60 on the operating pole 11. FIG. 4B illustrates a cross section taken along line 4B—4B in FIG. 4A.

Referring to FIGS. 4A and 4B, the operating pole 11 is a double pipe consisting of an outer pipe or tubular portion 71 and an inner pipe or tubular portion 72 which are concentric with one another and three spacing elements or stays 73 for connections between the outer and inner pipes 71 and 72. The double pipe is an aluminum alloy extrusion.

Each bush 60 is a cylindrical member integrally provided on the outer peripheral surface of the drive shaft 12. This cylindrical member is a hard resin product of a small friction resistance such as tetrafluoroethylene resin or polyacetal resin. The present invention is characterized in that the drive shaft 12 provided with the resin bushes 60 is inserted into the operating pole 11 in such a manner that it is slid at the outer peripheral surfaces of the resin bushes 60 on the inner peripheral surface of the operating pole (that is, the inner peripheral surface of the inner pipe 72).

The resin bushes 60 are thus integrally mounted on the drive shaft 12, so that the center of the resin bushes 60 can precisely agree with the center of the drive shaft 12. Further, the resin bushes 60 can be precisely positioned in the longitudinal direction of the drive shaft 12.

When the drive shaft 12 provided with the resin bushes 60 is inserted into the operating pole 11, the center of the resin buses 60 and the center of the drive shaft 12 can precisely agree with the center of the operating pole 11 so that the resin bushes 60 are slidable with respect to the operating pole 11. Further, the drive shaft 12 can be securely supported at predetermined positions on the operating pole 11.

Since the centers of the resin bushes 60 and the drive shaft 12 can precisely agree with the center of the operating pole 11, and the positions of the drive shaft 12 at which it is supported via the resin bushes 60 on the operating pole 11 can be precisely defined, the simple structure can further reduce vibration caused in the drive shaft 12. Further, since the resin bushes 60 are integrally mounted on the drive shaft 12, the positions of the resin bushes 60 are prevented from change during use.

The resin bushes 60 have peripheral grooves 62 formed in the middle of their outer peripheral surfaces for storing a lubricant 61.

To mount the resin bushes 60 on the drive shaft 12 by integral molding, a gate through which molten resin is injected into a molding cavity of a molding die is placed at the position of the peripheral groove 62. With this placement, if the removal of resin within the gate after molding lefts a fin, the fin is left only at the peripheral groove 62. The fin has no influence on the slide of the resin bush 60 on the operating pole 11.

The peripheral grooves 62 can store the lubricant 61 such as grease and oil, increasing lubricity during the slide of the resin bushes 60 on the operating pole 11, and reducing friction resistance and wear.

Figure 5:
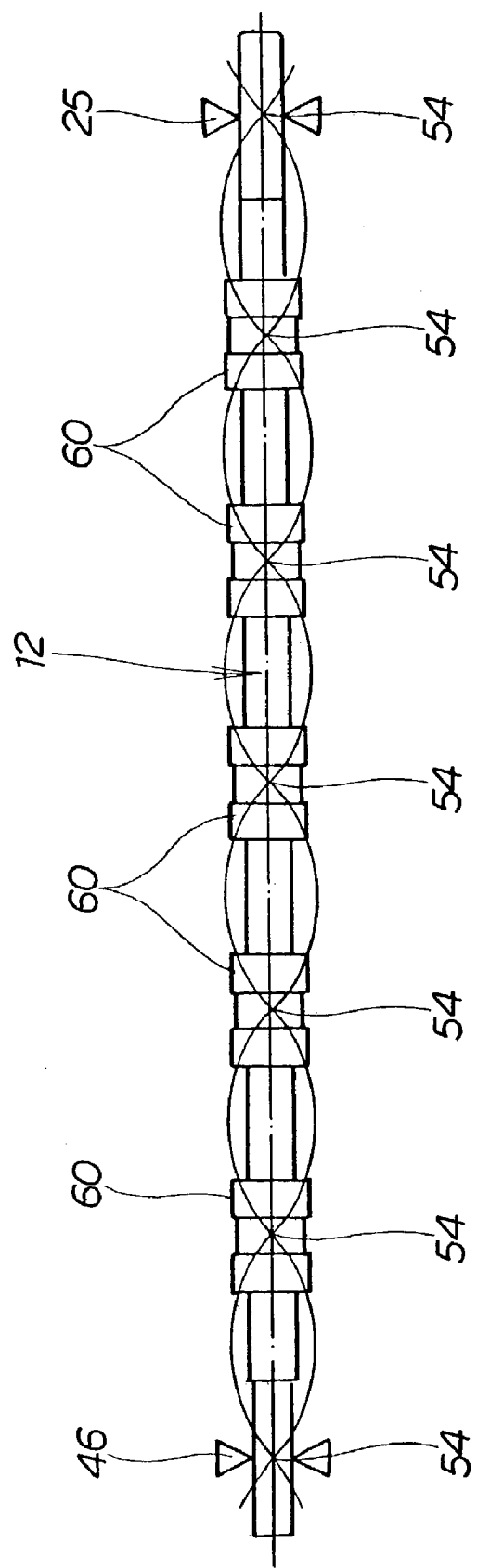
FIG. 5 is a diagram illustrating bushes arranged at nodes of vibration of the drive shaft shown in FIG. 3(a)

FIG. 5 illustrates the drive shaft 12 having the bushes 60. The bushes 60 are arranged at a plurality of nodes 54 of vibration to occur in the drive shaft 12. The vibration nodes 54 of the drive shaft 12 are points at which the amplitude of standing waves is zero.

The vibration nodes 54 of the drive shaft 12, that is, several points at which amplitude is zero are supported on the operating pole 11 (see FIG. 4A) via the resin bushes 60. Vibration transmitted from the motor 13 (see FIG. 1) via the drive shaft 12 and the resin bushes 60 to the operating pole 11 is thus further reduced.

Now, a method of integrally mounting the resin bushes 60 on the drive shaft 12 will be described with reference to FIGS. 6 to 11.

Figure 6:
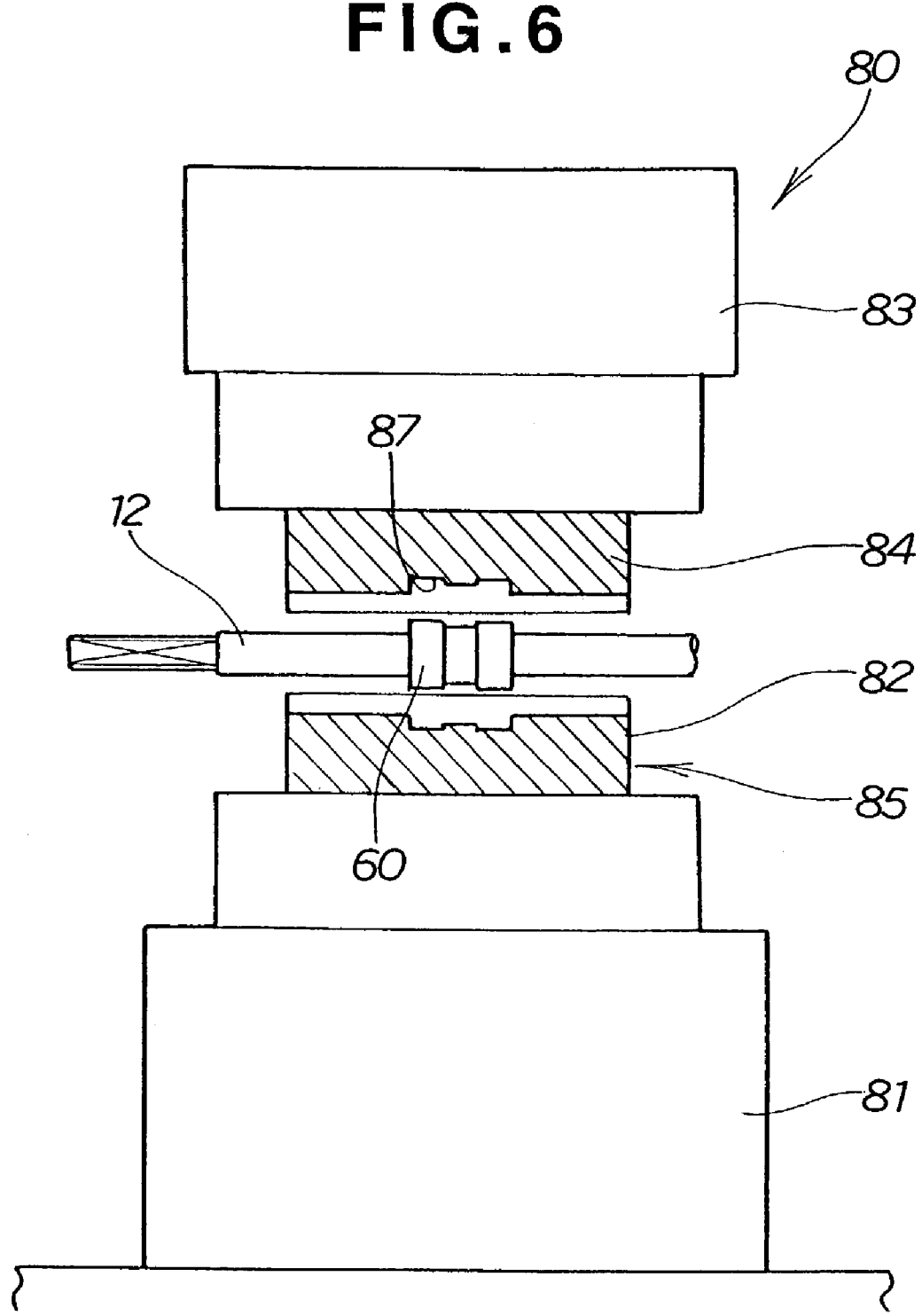
FIG. 6 is a schematic diagram of a molding machine for forming resin bushes according to the present invention on the drive shaft.

A molding machine 80 shown in FIG. 6 has a molding die 85 consisting of a fixed die 82 installed on a base 81 and a movable die 84 installed on an elevating stand 83. The movable die 84 is vertically movable with respect to the fixed die 82 in an openable and closable manner. The drive shaft 12 is placed horizontally to the molding die 85 to form the bush 60. The drive shaft 12 is longitudinally movable.

A method of outsert-molding the resin bushes 60 on the drive shaft 12 will be described with reference to FIGS. 7A to 11B.

In the molding method, first as shown in FIG. 7A, a plurality of fine long teeth 56 is formed longitudinally on the outer peripheral surfaces of predetermined bush molding portions 55 of the drive shaft 12 (first step). To form the teeth 56, a finishing machine 91 such as a rolling machine, a knurling machine or a serration finishing machine is used. The reason why the teeth 56 are provided is to provide the resin bushes 60 shown in FIG. 3 more firmly to the drive shaft 12.

FIG. 7B illustrates that the fine teeth 56 are formed on the outer peripheral surfaces of all the bush molding portions 55 of the drive shaft 12. The first step may be otherwise performed as required.

Figure 8A:
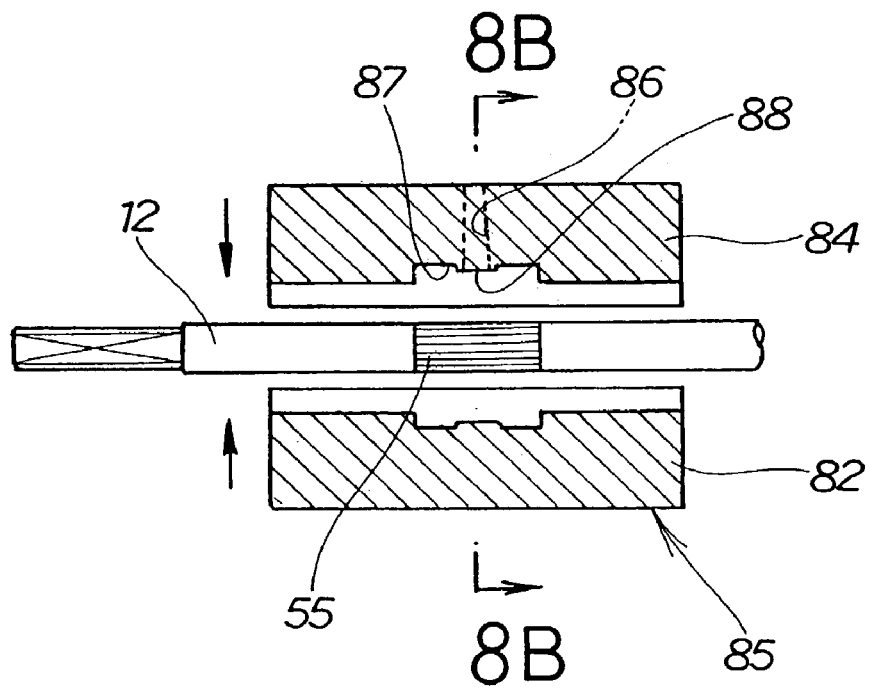
FIGS. 8A and 8B are diagrams of a second step in which a bush-forming portion of the drive shaft is positioned in a cavity to be placed in a molding die.
Figure 8B:
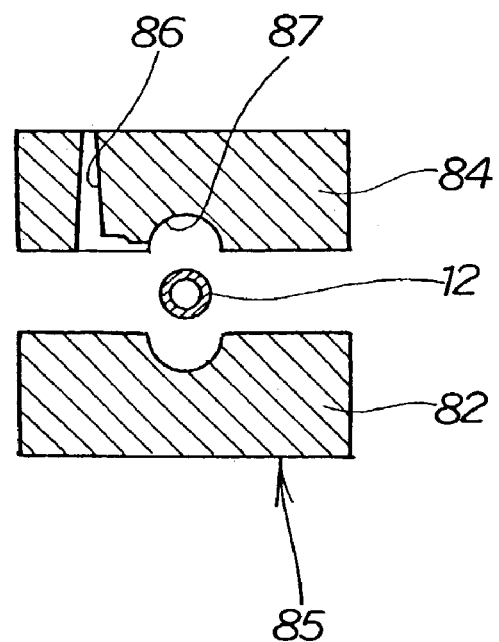

FIGS. 8A and 8B illustrate the open state of the molding die 85.

Subsequent to the first step shown in FIGS. 7A and 7B, the drive shaft 12 is placed in the molding die 85 so that a predetermined portion of the drive shaft 12, that is, the bush molding portion 55 is placed in the molding cavity 87 for clamping (second step).

Figure 9A:
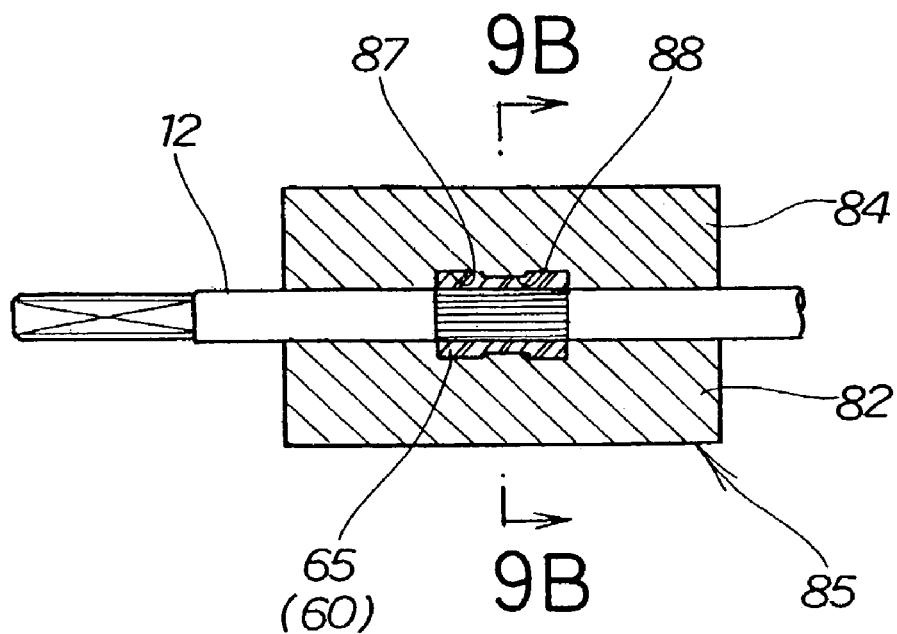
FIGS. 9A and 9B are diagrams of a third step in which the molding die is closed and molten resin is injected into the cavity, forming the bush.
Figure 9B:
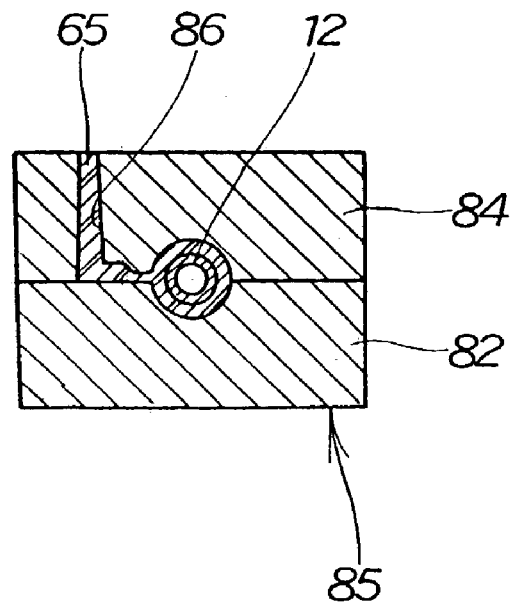

FIGS. 9A and 9B illustrate the closed state of the molding die 85.

Subsequent to the second step shown in FIGS. 8A and 8B, the molding die 85 is closed and molten resin 65 is injected through a gate 86 of the molding die 85 into the molding cavity 87, forming the bush 60 (third step). The gate 86 is placed at a position 88 corresponding to the peripheral groove 62 (see FIG. 4A) of the bush 60 in the molding cavity 87.

Figure 10A:
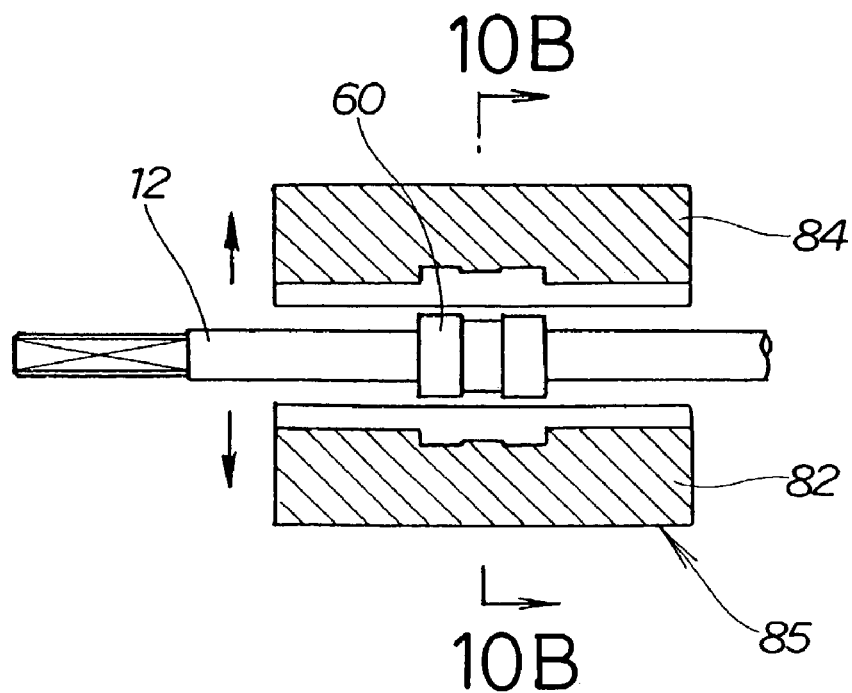
FIGS. 10A and 10B are diagrams of a fourth step in which the molding die is opened.
Figure 10B:
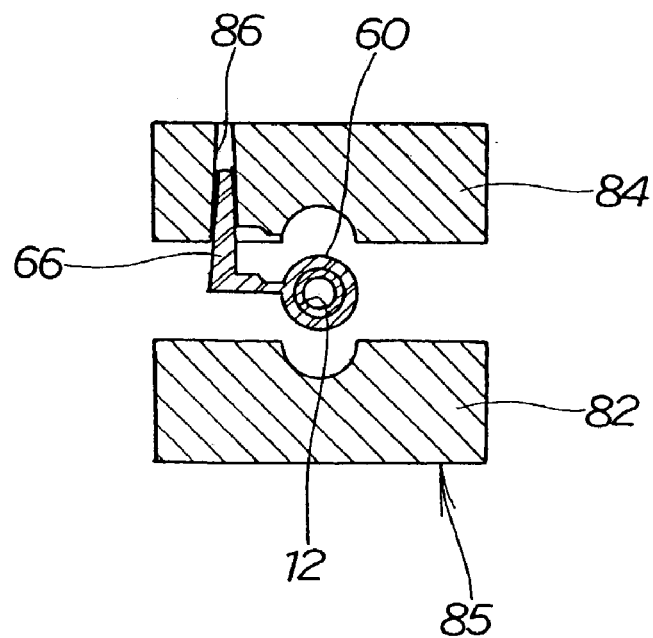

FIGS. 10A and 10B illustrate the opened state of the molding die 85.

Subsequent to the third step shown in FIGS. 9A and 9B, the molding die 85 is opened after the bush 60 is cooled (fourth step).

Figure 11A:
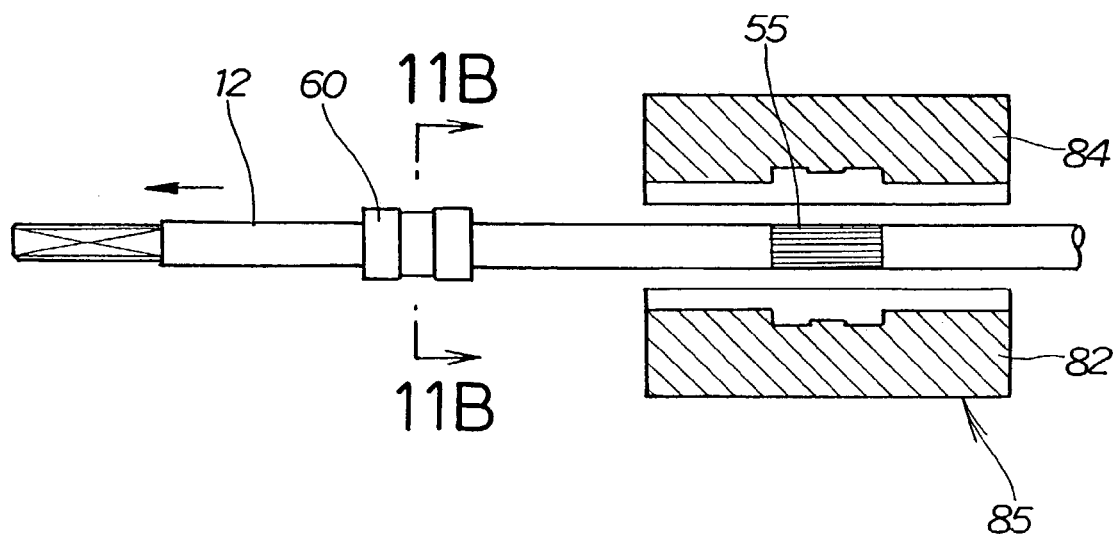
FIGS. 11A and 11B are diagrams of a fifth step in which the drive shaft is shifted to place a next bush-forming portion in the molding die to form a next bush.
Figure 11B:
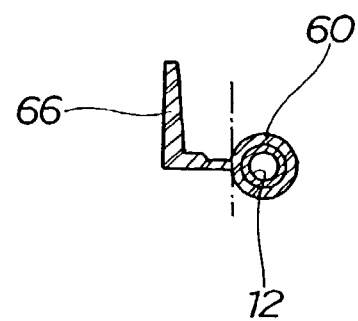
Figure 12A:
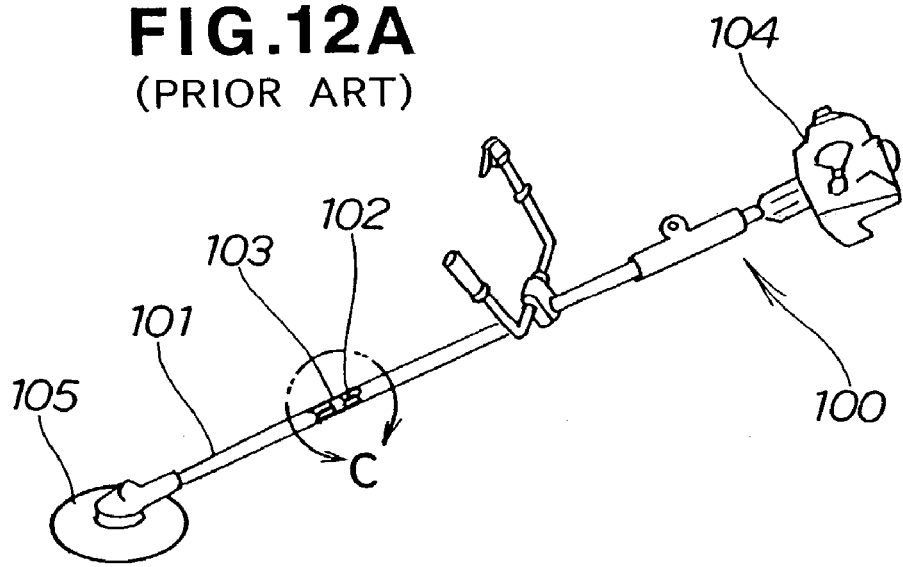
FIG. 12A is a conventional portable working machine.
Figure 12B:
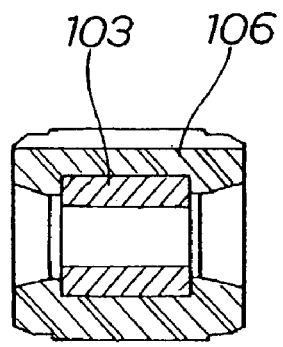
FIG. 12B is a cross-sectional view of a conventional bush shown in FIG. 12A.
Figure 12C:
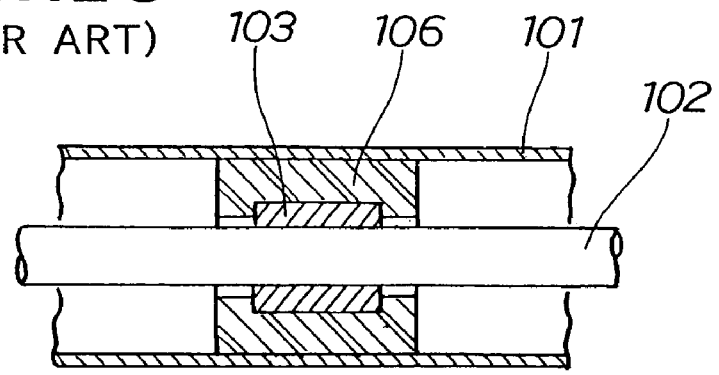
FIG. 12C is an enlarged cross-sectional view of portion c in FIG. 12A.

FIGS. 11A and 11B illustrate the molding die 85 opened to form a bush at a next predetermined portion of the drive shaft 12.

Subsequent to the fourth step shown in FIGS. 10A and 10B, the drive shaft 12 is moved in the axis direction to place a next predetermined portion of the drive shaft 12, that is, the bush forming portion 55 in the molding die 85 as shown in FIG. 11A (fifth step).

Of the above-described steps, the second to fifth steps are repeated to integrally form all the bushes 60 on the drive shaft 12.

Then, resin 66 within the gate shown in FIG. 11B, that is, resin left and solidified within the gate 86 (see FIG. 9B) is removed to complete the bush molding process.

As described above, the successive integral molding of the resin bushes 60 on the drive shaft 12 allows easily integrally forming the resin bushes 60 on the outer peripheral surface of the drive shaft 12 by a simple method.

The integral molding of the bushes 60 on the drive shaft 12 allows precise agreement of the axis center of the resin bushes 60 with the axis center of the drive shaft 12. Further, the resin bushes 60 are prevented from displacement in the longitudinal direction of the drive shaft 12.

In the above embodiment, the portable working machine is not limited to the grass cutter 10.

The operating pole 11 is not limited to a double pipe and may be a single pipe.

What is claimed is:

1. In combination: a tubular member for use in a portable working machine; and a drive shaft extending into the tubular member for undergoing rotation relative thereto, the drive shaft having a longitudinal axis and a plurality of resin bushes integrally mounted on the drive shaft for rotation therewith at positions along the longitudinal axis of the drive shaft corresponding to vibration nodes of the drive shaft, each of the resin bushes having an outer peripheral surface disposed in slidable contact with an inner peripheral surface of the tubular member and a peripheral groove formed in the outer peripheral surface thereof for storing a lubricant.

2. A combination according to claim 1; wherein the peripheral groove is formed at a central portion of the outer peripheral surface of the corresponding resin bush.

3. A combination according to claim 1; wherein the tubular member comprises a first tubular portion having the inner peripheral surface disposed in slidable contact with the resin bushes, a second tubular portion surrounding the first tubular portion, and a plurality of spacing elements connecting the first and second tubular portions in spaced-apart relation to one another.

4. A combination according to claim 3; wherein the tubular member, the drive shaft, and the resin bushes are concentrically disposed relative one another.

5. A combination according to claim 1; wherein the tubular member, the drive shaft, and the resin bushes are concentrically disposed relative one another.

* * * * *